United States Patent
Ermert et al.

(10) Patent No.: US 11,358,975 B2
(45) Date of Patent: Jun. 14, 2022

(54) PROCESS FOR PREPARING ORGANOTIN COMPOUNDS

(71) Applicant: ENTEGRIS, INC., Billerica, MA (US)

(72) Inventors: David M. Ermert, Danbury, CT (US); Thomas M. Cameron, Newtown, CT (US); David Kuiper, Brookfield, CT (US); Thomas H. Baum, New Fairfield, CT (US)

(73) Assignee: ENTEGRIS, INC., Billerica, MA (US)

( * ) Notice: Subject to any disclaimer, the term of this patent is extended or adjusted under 35 U.S.C. 154(b) by 0 days.

(21) Appl. No.: 17/366,470

(22) Filed: Jul. 2, 2021

(65) Prior Publication Data

US 2022/0002323 A1    Jan. 6, 2022

Related U.S. Application Data

(60) Provisional application No. 63/047,984, filed on Jul. 3, 2020.

(51) Int. Cl.
*C07F 7/22* (2006.01)

(52) U.S. Cl.
CPC ........ *C07F 7/2284* (2013.01); *C07B 2200/13* (2013.01)

(58) Field of Classification Search
CPC .................................................... C07F 7/2284
See application file for complete search history.

(56) References Cited

U.S. PATENT DOCUMENTS

| | | | |
|---|---|---|---|
| 4,675,441 A * | 6/1987 | McEntire | C07F 7/2284 544/168 |
| 9,298,083 B2 | 3/2016 | Chang | |
| 10,025,179 B2 | 7/2018 | Meyers | |
| 10,228,618 B2 | 3/2019 | Meyers et al. | |
| 10,642,153 B2 | 5/2020 | Meyers | |
| 10,787,466 B2 | 9/2020 | Edson et al. | |
| 2018/0155372 A1 * | 6/2018 | Ryu | C07F 7/2284 |
| 2019/0315782 A1 * | 10/2019 | Edson | C07F 7/2284 |
| 2019/0337969 A1 | 11/2019 | Odedra et al. | |
| 2020/0064733 A1 | 2/2020 | Meyers | |
| 2020/0231610 A1 * | 7/2020 | Ryu | C23C 16/407 |

FOREIGN PATENT DOCUMENTS

| | | | | |
|---|---|---|---|---|
| CA | 2975104 A1 * | 2/2019 | | C23C 16/407 |
| CN | 101522697 B | 5/2013 | | |
| WO | 2019023797 A1 | 2/2019 | | |
| WO | WO-2021038523 A1 * | 3/2021 | | C04B 41/5346 |

OTHER PUBLICATIONS

CAS Abstract and Indexed Reactions D. Fabulyak et al., WO 2021/038523 (2021) (Year: 2021).*
Z. Padělková et al., 695 Journal of Organometallic Chemistry, 2651-2657 (2010) (Year: 2010).*
CAS Abstract and Indexed Compounds Z. Padělková et al., 695 Journal of Organometallic Chemistry, 2651-2657 (2010) (Year: 2010).*
R. Chorley et al., J. Chem. Soc., Chem. Commun., 1302-1303 (1991) (Year: 1991).*
J. Chem. Soc., Chem. Commun., 1991, 1302-1303 (abstract only).

* cited by examiner

*Primary Examiner* — Alexander R Pagano
(74) *Attorney, Agent, or Firm* — Entegris, Inc.

(57) ABSTRACT

Provided is an efficient and effective process for preparing certain organotin compounds having alkyl and alkylamino substituents. The process provides the organotin compounds in a highly pure crystalline form which are particularly useful as precursors in the deposition of high-purity tin oxide films in, for example, extreme ultraviolet light (EUV) lithography techniques used in the manufacture of certain microelectronic devices.

18 Claims, 3 Drawing Sheets

PROCESS FOR PREPARING ORGANOTIN COMPOUNDS

CROSS-REFERENCE TO RELATED APPLICATIONS

This application claims the benefit under 35 USC 119 of U.S. Provisional Patent Application No. 63/047,984 filed Jul. 3, 2020, the disclosure of which is hereby incorporated herein by reference in its entirety.

FIELD OF THE INVENTION

This invention belongs to the field of organotin chemistry. In particular, it relates to an efficient and effective process for preparing certain organotin compounds, for example, isopropyl tris(dimethylamido) tin.

BACKGROUND OF THE INVENTION

Certain organotin compounds have been shown to be useful in the deposition of highly pure tin (II) oxide in applications such as extreme ultraviolet (EUV) lithography techniques used in the manufacture of certain microelectronic devices. Of particular interest are organotin compounds having a combination of alkylamino groups and alkyl groups, which can be difficult to provide in high purity.

Accordingly, there is a need to provide an improved methodology for manufacturing such organotin compounds in highly pure forms for use in the deposition of highly pure tin oxide films.

SUMMARY OF THE INVENTION

Provided herein is a process for preparing certain organotin compounds having alkyl and alkylamino substituents, such as a compound of Formula (I): $R_1$—Sn—$(NR_2)_3$ wherein R, which can be the same or different, is a $C_1$-$C_4$ alkyl group and $R_1$ is a substituted or unsubstituted saturated or unsaturated linear, branched, or cyclic $C_1$-$C_5$ group. A specific example of a compound having Formula (I) is isopropyl tris(dimethylamido) tin (CAS No. 1913978-89-8). The process comprises contacting a compound of Formula (A), described in more detail herein, with a compound of Formula $R_1$—X, wherein X is bromo, iodo, or chloro. The process also produces a compound of Formula (II), and the present invention also relates to this compound. Advantageously, the process provides the organotin precursor compounds of Formula (I) in a highly pure form such as in greater than 98% purity. Due to their high purity, the organotin compounds described herein are particularly useful in the deposition of high-purity tin oxide (SnOx) films in, for example, extreme ultraviolet light (EUV) lithography techniques used in microelectronic device manufacturing.

DETAILED DESCRIPTION OF THE INVENTION

Figure 1:
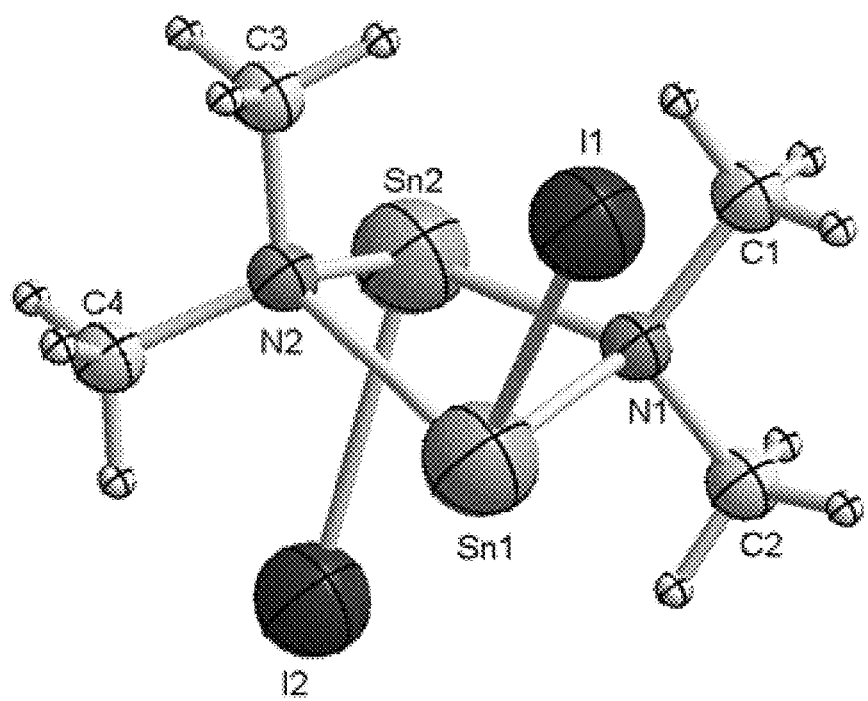
FIG. 1 is a crystal structure depiction of the compound of Formula (II) as a by-product of the process as set forth herein, wherein each R is methyl and each X is iodo.

The present invention relates to a process for preparing organotin compounds having alkyl and alkylamino substituents.

In a first embodiment, the invention provides a process for preparing a monoalkyl tris(dialkylamido) tin compound of the Formula (I):

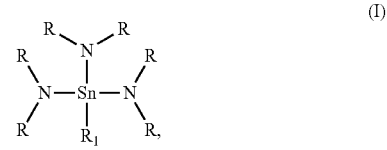

In this formula, each R may be the same or different and is a $C_1$-$C_4$ alkyl group and $R_1$ is a substituted or unsubstituted saturated or unsaturated linear, branched, or cyclic $C_1$-$C_5$ group. The process comprises contacting a compound of Formula (A)

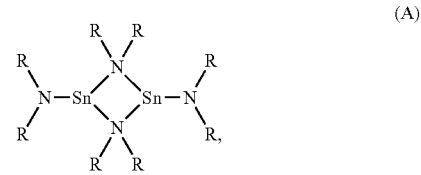

with a compound having the Formula $R_1$—X, wherein X is bromo, iodo, or chloro. In an embodiment of this process, each R can be independently chosen from a methyl, ethyl, propyl, isopropyl, n-butyl, isobutyl, t-butyl, and sec-butyl group. In a particular embodiment, each R is a methyl group. Furthermore, $R_1$ can be chosen from a methyl, ethyl, propyl, isopropyl, n-butyl, isobutyl, t-butyl, sec-butyl, n-pentyl, iso-pentyl, or neopentyl group. In addition, $R_1$ can be a cyclic $C_1$-$C_5$ group such as a cyclopropyl group. Also, $R_1$ may be an unsaturated $C_1$-$C_5$ group such as a vinyl group or an acetylenyl group. Any of these $R_1$ groups may be further substituted, such as with one or more halogen groups or ether groups. For example, $R_1$ may be a fluorinated alkyl group having the formula —$(CH_2)_n(CH_aF_b)_m$, wherein m=1 to 5 and m+n=1 to 5 and wherein b=1 to 3 and a+b=3, including a monofluorinated $C_1$-$C_5$ alkyl group, such as a —$CH_2F$ or —$CH_2CH_2F$ group, and a perfluorinated $C_1$-$C_5$ group, such as a —$CF_3$ or $CF_2CF_3$ group. Alternatively, $R_1$ may be an alkylether group, wherein the alkyl portion is a $C_1$-$C_5$ alkyl group. In a particular embodiment, $R_1$ is an unsubstituted $C_1$-$C_5$ alkyl group, such as a $C_1$-$C_3$ alkyl group. For example, each R may be methyl and $R_1$ may be isopropyl.

As shown above, the starting material used in this process is a compound of Formula (A):

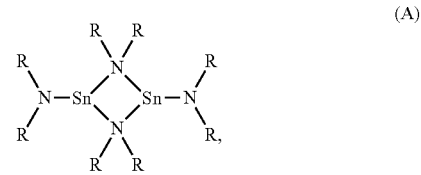

This compound can be prepared by known methods, such as, for example, by reacting tin(II) chloride ($SnCl_2$) with a compound of the formula $M-N(R)_2$, wherein M is a metal chosen from sodium, lithium, and potassium. Thus, an embodiment of the present invention is a process for preparing a compound of Formula (I), which further comprises the prior step of preparing the starting material of Formula (A) by reacting tin(II) chloride with a compound of Formula $M-N(R)_2$, wherein M is a metal cation, such as an Al, Mg, or Ca cation or a Group 1 or Group 2 cation such as sodium, lithium, or potassium. As a specific example, M can be lithium and R can be methyl. In such a case, the lithium chloride thus formed may be removed, such as via filtration if desired, prior to contacting the resulting compound of Formula (A) with the compound of Formula $R_1$—X. Otherwise, the formed starting material compound of Formula (A) can be used as is without filtration in the form of a slurry with a compound of formula M-Cl (such as lithium chloride) having precipitated) for reaction in the same reaction vessel. Accordingly, the process of the present invention provides a one-pot synthesis of the compound of Formula (I).

The reaction provides a mixture of the compound of Formula (I), as shown above, along with a by-product of Formula (II):

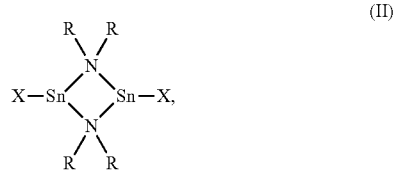

wherein each R may be the same or different and is a $C_1$-$C_4$ alkyl group and each X is chosen from iodo, bromo, and chloro. Accordingly, the present invention further provides by-product compounds of Formula (II). For example, in one embodiment of this by-product, each R is the same or different and is a $C_1$-$C_4$ alkyl group and each X is chosen from iodo, bromo, and chloro, provided that when X is chloro, R is other than methyl. In another embodiment, each R is the same or different and is a $C_1$-$C_4$ alkyl group and each X is either iodo or bromo. The crystal structure of a compound of Formula (II), wherein each R is methyl and each X is iodo, is depicted in FIG. 1. These by-products of Formula (II) are also expected to be useful as precursor compounds for the deposition of tin oxide films (such as tin(II) or tin(IV) oxide films) as well as being useful as intermediates in the synthesis of other useful organotin precursor compounds.

The process of the present invention can be conducted either neat (i.e., without any added solvent) or in a solvent which is otherwise non-reactive with the starting materials or products. Examples of suitable solvents are non-polar aprotic solvents including liquid hydrocarbons such as hexanes, benzene, or toluene; polar aprotic solvents such as tetrahydrofuran or dimethoxyethane; and mixtures of non-polar aprotic and polar aprotic solvents. When conducted neat without any added solvent, an excess of the compound of Formula $R_1$—X may be used, particularly when this compound is a liquid. Also, the process may be conducted via an exchange reaction, using a halogen exchange reagent in combination with the compound of Formula $R_1$—X.

The process is conducted at a temperature suitable for the disclosed reagents to react. For example, the reaction temperature may be in a range of from near room temperature (such as about 20° C.) to about 80° C. In a preferred embodiment, the process is conducted at a temperature of room temperature (23° C.) to about 65° C., such as about 50° C. to about 70° C. or about 60° C.

As noted above, in the synthesis of the starting material of Formula (A), the lithium halide by-product (e.g., LiCl) can be removed via filtration. The resulting starting material can be used as-is in the same reaction vessel for further reaction with the compound of Formula $R_1$—X to form the compound of Formula (I), which can be further purified, such as via distillation, to provide a product having advantageously low levels of impurities.

The present invention can be further illustrated by the embodiments included herein, although it will be understood that these embodiments are included merely for purposes of illustration and are not intended to limit the scope of the invention unless otherwise specifically indicated.

EXAMPLE 1

Isopropyl tris(dimethylamido) tin was prepared using the reaction sequence as described above and shown below:

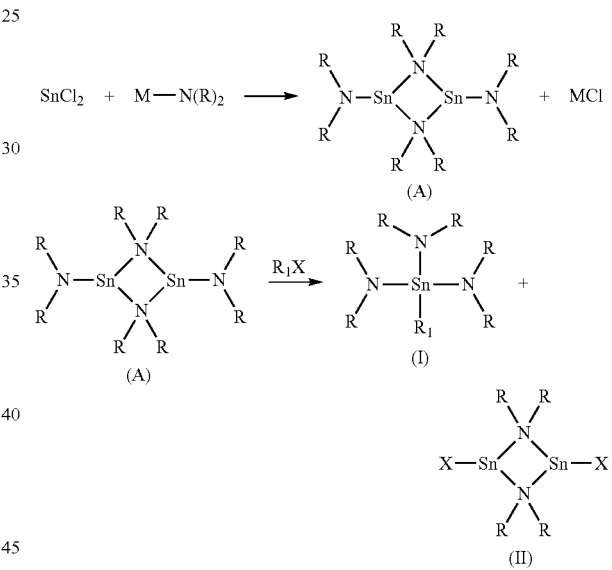

Thus, a 3-neck 500 mL round bottom flask equipped with a magnetic stir bar was charged with 12.2 g lithium dimethylamide (239 mmol) and 250 mL hexanes. To this off-white slurry was added 21.6 g $SnCl_2$ (113 mmol) and the resulting mixture was stirred at 60° C. for 72 hours. The resulting gray-green slurry was cooled to 23° C., giving a mixture including the compound of Formula (A).

Without further purification, the mixture was treated with 11.5 g 2-iodopropane (68.2 mmol). The reaction mixture was then heated to 60° C. for 18 hours. After the reaction mixture had cooled to 23° C., it was filtered through a coarse porosity fritted filter into a 500 mL flask, and the filter cake was washed with a 500 ml aliquot of anhydrous hexanes to give a light yellow clear solution. The solvent and other volatiles were then removed from the filtrates under reduced pressure, to produce a mixture of product of Formula (I) and byproduct of Formula (II).

Figure 2A:
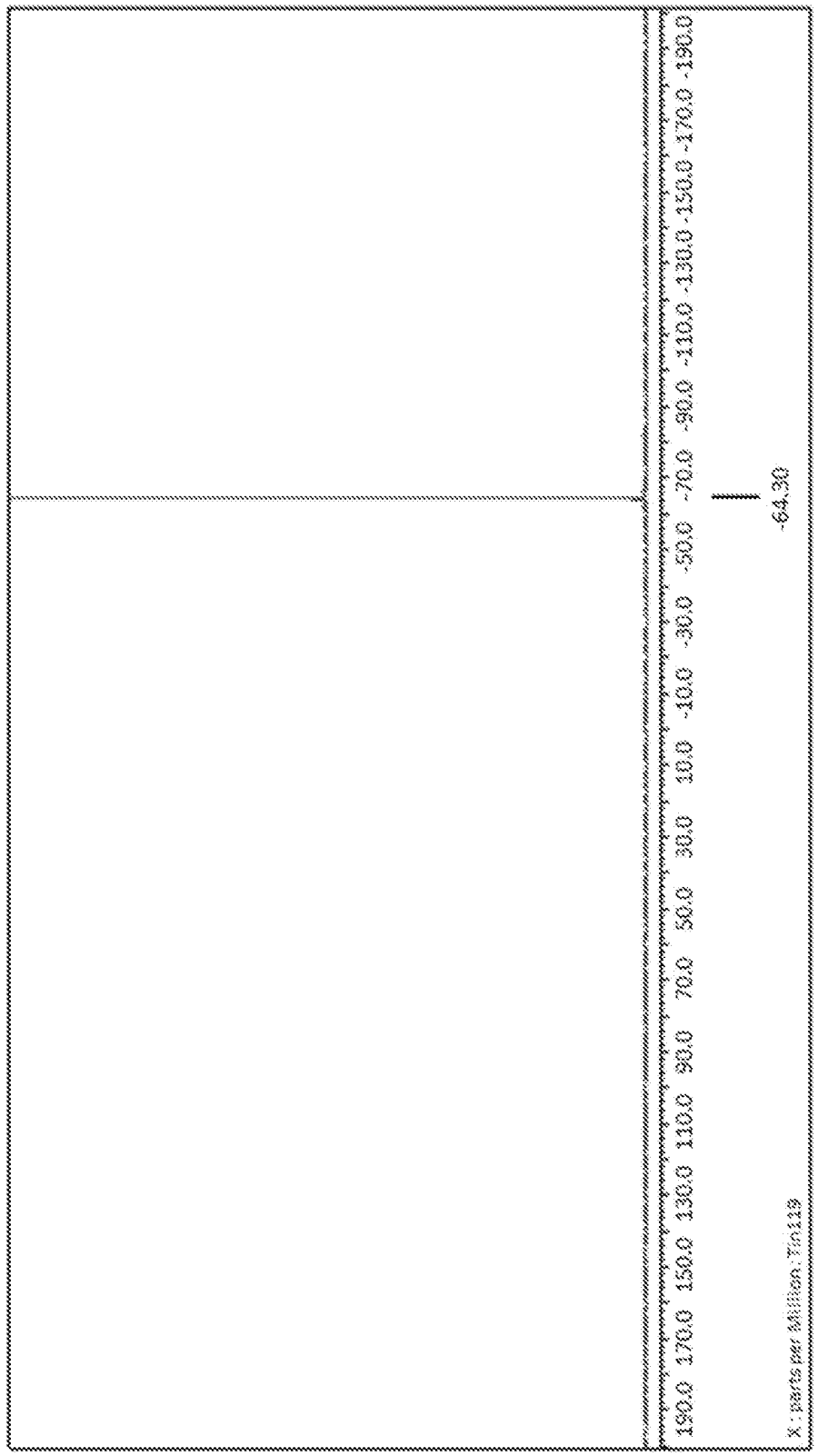
FIG. 2A and FIG. 2B are $^{119}$Sn-NMR and $^{1}$-H-NMR spectra respectively taken in d6-benzene of the compound of Formula (I) as a product of the process set forth herein, wherein each R is a methyl group and $R_1$ is an isopropyl group.
Figure 2B:
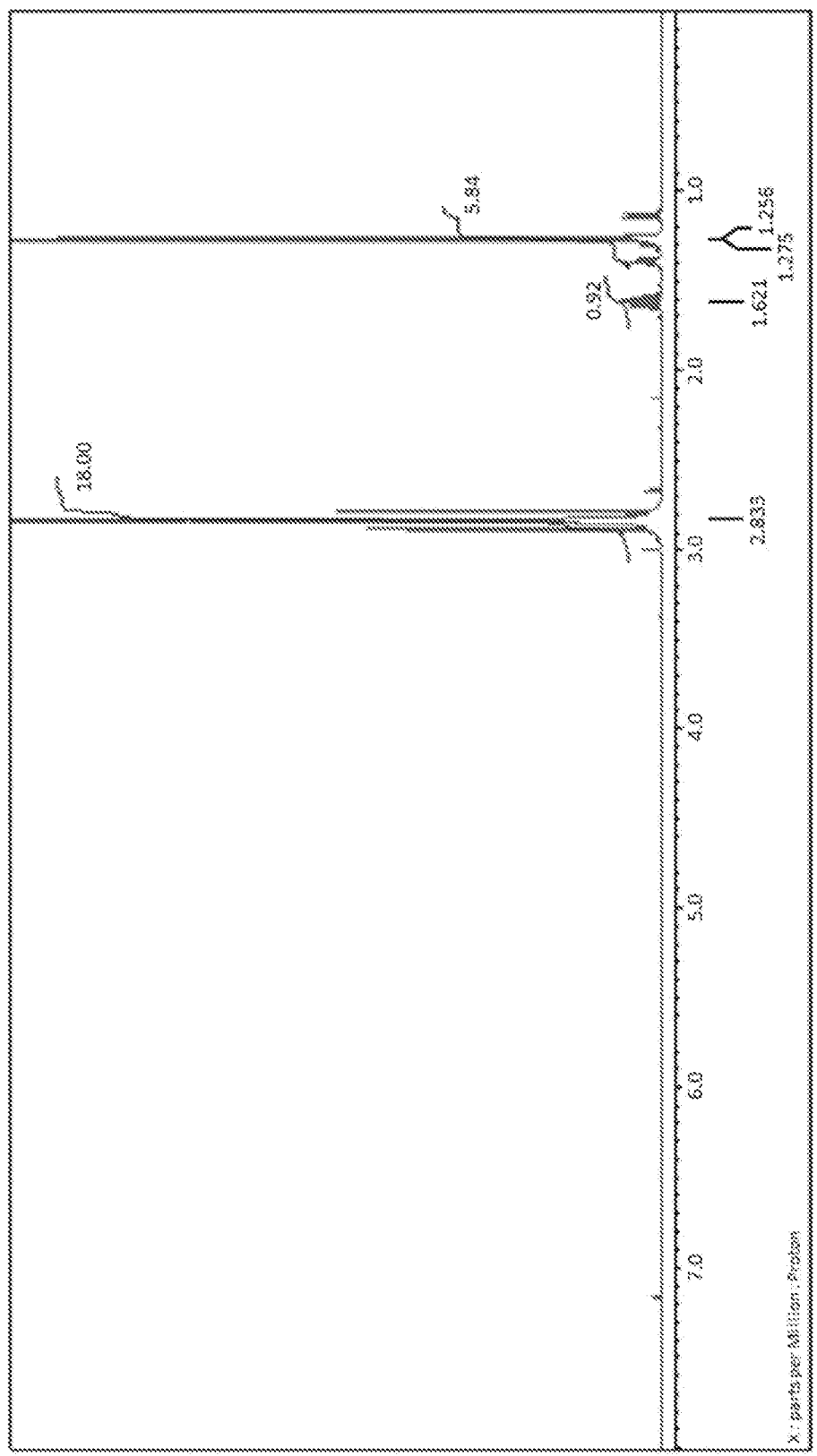

When the removal of volatiles was complete, the oil that remained was filtered through a 0.2 micron syringe filter to give 10.6 g of an orange oil. The orange oil was placed in a −30° C. freezer overnight which resulted in the precipitation of [ISn(NMe$_2$)]$_2$ as a yellow solid. This yellow solid was removed by filtration through a 0.2 micron syringe filter. The remaining orange oil was then distilled using a short-path distillation at 610-645 mtorr with a head temperature of 34-37° C. to give a isopropyl tris(dimethylamido) tin as a clear light yellow-green oil distillate (6.09 g, 36.5%). $^1$H-NMR (400 MHz, benzene-d6): δ 2.83 ($^1$H-$^{119/117}$Sn)=n)=20.8 Hz, 18H), 1.68-1.57 (m, 1H), 1.27 (d, Eh-13C=7.3 Hz, 6H). $^{119}$Sn NMR: 64.30. The $^{119}$Sn-NMR and $^1$H-NMR spectrum are shown in FIGS. 2A and 2B respectively, demonstrating that the product was of high purity.

The by-product, [ISn(NMe$_2$)]$_2$ was found to be a crystalline solid and therefore also of high purity, such as greater than 95% pure, including greater than 98%, 99%, or 99.5%. The crystal structure is shown in FIG. 1, and the crystallinity data is provided in Table 1 and Table 2. Due to their high purity, these organotin compounds would be expected to be useful in the deposition of high-purity tin oxide films in, for example, extreme ultraviolet light (EUV) lithography techniques used in microelectronic device manufacturing.

TABLE 1

Crystal data and structure refinement for [ISn(NMe$_2$)]$_2$.

| | |
|---|---|
| Empirical formula | C4 H12 I2 N2 Sn2 |
| Molecular formula | C4 H12 I2 N2 Sn2 |
| Formula weight | 579.34 |
| Temperature | 100.15 K |
| Wavelength | 0.71073 Å |
| Crystal system | Orthorhombic |
| Space group | Pbcn |
| Unit cell dimensions | a = 22.0958(5) Å  α = 90°. |
| | b = 10.2623(3) Å  β = 90°. |
| | c = 10.9856(3) Å  γ = 90°. |
| Volume | 2491.03(11) Å$^3$ |
| Z | 8 |
| Density (calculated) | 3.090 Mg/m$^3$ |
| Absorption coefficient | 8.919 mm$^{-1}$ |
| F(000) | 2048 |
| Crystal size | 0.2 × 0.18 × 0.18 mm$^3$ |
| Crystal color, habit | light yellow block |
| Theta range for data collection | 1.843 to 27.102°. |
| Index ranges | −28 <= h <= 28, −13 <= k <= 12, |
| | −14 <= l <= 14 |
| Reflections collected | 25802 |
| Independent reflections | 2748 [R(int) = 0.0740] |
| Completeness to theta = 25.242° | 100.0 % |
| Absorption correction | Semi-empirical from equivalents |
| Max. and min. transmission | 0.2616 and 0.1599 |
| Refinement method | Full-matrix least-squares on F$^2$ |
| Data/restraints/parameters | 2748/0/96 |
| Goodness-of-fit on F$^2$ | 1.259 |
| Final R indices [I > 2sigma(I)] | R1 = 0.0291, wR2 = 0.0713 |
| R indices (all data) | R1 = 0.0300, wR2 = 0.0720 |
| Extinction coefficient | 0.00069(5) |
| Largest diff peak and hole | 1.367 and −0.890 e.Å$^{-3}$ |

TABLE 2

Bond lengths [Å] and angles [°] for [ISn(NMe$_2$)]$_2$

| | | |
|---|---|---|
| Lengths: | I(1)—Sn(1) | 2.8492(5) |
| | I(2)—Sn(2) | 2.8448(5) |
| | Sn(1)—N(1) | 2.252(4) |
| | Sn(1)—N(2) | 2.267(4) |
| | Sn(2)—N(1) | 2.245(4) |
| | Sn(2)—N(2) | 2.243(4) |
| | N(1)—C(1) | 1.477(6) |
| | N(1)—C(2) | 1.484(6) |
| | N(2)—C(3) | 1.480(7) |
| | N(2)—C(4) | 1.482(6) |

TABLE 2-continued

Bond lengths [Å] and angles [°] for [ISn(NMe$_2$)]$_2$

| | | |
|---|---|---|
| | C(1)—H(1A) | 0.9800 |
| | C(1)—H(1B) | 0.9800 |
| | C(1)—H(1C) | 0.9800 |
| | C(2)—H(2A) | 0.9800 |
| | C(2)—H(2B) | 0.9800 |
| | C(2)—H(2C) | 0.9800 |
| | C(3)—H(3A) | 0.9800 |
| | C(3)—H(3B) | 0.9800 |
| | C(3)—H(3C) | 0.9800 |
| | C(4)—H(4A) | 0.9800 |
| | C(4)—H(4B) | 0.9800 |
| | C(4)—H(4C) | 0.9800 |
| Angles: | N(1)—Sn(1)—I(1) | 98.21(10) |
| | N(1)—Sn(1)—N(2) | 78.97(14) |
| | N(2)—Sn(1)—I(1) | 95.40(11) |
| | N(1)—Sn(2)—I(2) | 93.25(10) |
| | N(2)—Sn(2)—I(2) | 92.67(11) |
| | N(2)—Sn(2)—N(1) | 79.62(14) |
| | Sn(2)—N(1)—Sn(1) | 97.25(14) |
| | C(1)—N(1)—Sn(1) | 118.1(3) |
| | C(1)—N(1)—Sn(2) | 108.3(3) |
| | C(1)—N(1)—C(2) | 108.3(4) |
| | C(2)—N(1)—Sn(1) | 110.2(3) |
| | C(2)—N(1)—Sn(2) | 114.5(3) |
| | Sn(2)—N(2)—Sn(1) | 96.88(15) |
| | C(3)—N(2)—Sn(1) | 119.8(3) |
| | C(3)—N(2)—Sn(2) | 105.7(3) |
| | C(3)—N(2)—C(4) | 108.0(4) |
| | C(4)—N(2)—Sn(1) | 110.1(3) |
| | C(4)—N(2)—Sn(2) | 116.5(3) |
| | N(1)—C(1)—H(1A) | 109.5 |
| | N(1)—C(1)—H(1B) | 109.5 |
| | N(1)—C(1)—H(1C) | 109.5 |
| | H(1A)—C(1)—H(1B) | 109.5 |
| | H(1A)—C(1)—H(1C) | 109.5 |
| | H(1B)—C(1)—H(1C) | 109.5 |
| | N(1)—C(2)—H(2A) | 109.5 |
| | N(1)—C(2)—H(2B) | 109.5 |
| | N(1)—C(2)—H(2C) | 109.5 |
| | H(2A)—C(2)—H(2B) | 109.5 |
| | H(2A)—C(2)—H(2C) | 109.5 |
| | H(2B)—C(2)—H(2C) | 109.5 |
| | N(2)—C(3)—H(3A) | 109.5 |
| | N(2)—C(3)—H(3B) | 109.5 |
| | N(2)—C(3)—H(3C) | 109.5 |
| | H(3A)—C(3)—H(3B) | 109.5 |
| | H(3A)—C(3)—H(3C) | 109.5 |
| | H(3B)—C(3)—H(3C) | 109.5 |
| | N(2)—C(4)—H(4A) | 109.5 |
| | N(2)—C(4)—H(4B) | 109.5 |
| | N(2)—C(4)—H(4C) | 109.5 |
| | H(4A)—C(4)—H(4B) | 109.5 |
| | H(4A)—C(4)—H(4C) | 109.5 |
| | H(4B)—C(4)—H(4C) | 109.5 |

EXAMPLE 2

F$_3$CSn(NMe$_2$)$_3$ was prepared using the reaction sequence as described for Example 1. Specifically, [Sn(NMe$_2$)$_2$]$_2$ (23.1 g, 55.6 mmol) was loaded into a 250 mL roundbottom flask equipped with a magnetic stir bar and dissolved in hexanes (125 mL). The flask was equipped with a cylinder of I-CF$_3$ (25 g, 127.6 mmol) via a 1/4 PTFE tube and 24/40 tubing adapter. Slowly, the I-CF$_3$ was bubbled into the hexanes solution with stirring in the dark. After approximately 10 minutes, the reaction presented with a yellow precipitate. After approximately 30 minutes, all of the gas had been added, and the reaction presented with a flocculent yellow precipitate. The cylinder was then removed and massed, confirming that all of the desired I-CF$_3$ had been added. The reaction was covered with foil and stirred at room temperature in the dark over the weekend. After this time, the reaction presented as a yellow/tan precipitate and was filtered over a disposable polyethylene filter frit and washed with hexanes (25 mL). The resulting pale yellow solution dried under reduced pressure until approximately 5 mL remained. A $^1$H-NMR, $^{19}$F-NMR, and $^{119}$Sn-NMR of a $C_6D_6$ solution of the product showed hexanes still remained (approximately 5 mol). A tan solid (28.7 g) was isolated along with 4 g (22.5%) of a slightly yellow liquid. $^1$H-NMR ($C_6D_6$, 400 MHz); s, 18H, 2.69 ppm; $^{119}$Sn-NMR ($C_6D_6$, 150 MHz); q, −153.07 ppm; $^{19}$F-NMR ($C_6D_6$, 376 MHz); −42.7 ppm.

EXAMPLE 3

$F_3CCH_2Sn(NMe_2)_3$ was prepared using a procedure similar to that shown in Example 2. Specifically, $[Sn(NMe_2)_2]2$ (140 g, 336 mmol) was placed in a 1 L schlenk flask equipped with a magnetic stir bar and diluted with approximately 400 mL of hexanes to form a yellow mixture. I—$CH_2$—$CF_3$ was placed in a 250 mL additional funnel and attached to the schlenk flask. A slow addition rate was achieved (approximately 0.5-1 drop/sec), and the 1 L flask was covered with aluminum foil and stirred in the dark. After approximately 2.5 hrs, addition of the I—$CH_2CF_3$ was complete, and the resulting yellow mixture was stirred in the dark overnight at RT. After this time, the reaction presented with a bright yellow solid precipitate and red/orange solution. The precipitate was isolated by filtration through a disposable polyethylene filter frit into a 500 mL schlenk flask equipped with a magnetic stir bar. The filter cake was washed with hexanes (approximately 30 mL), and the resulting orange solution dried under reduced pressure to yield a light-yellow solution with a yellow precipitate. The mixture was filtered through a 0.2 um syringe filter into two tared amber 40 mL vials to yield 87.91 g (78.5% crude yield) of the product as a pale-yellow liquid. $^1$H-NMR, $^{19}$F-NMR, and $^{119}$Sn-NMR results of a 1:1 product: $C_6D_6$ solution: $^1$H-NMR ($C_6D_6$, 400 MHz); s, 18H, 2.66 ppm; q, 2H, 1.52 ppm; $^{119}$Sn-NMR ($C_6D_6$, 150 MHz); q, −62.47 ppm; $^{19}$F-NMR ($C_6D_6$, 376 MHz); q, −51.93 ppm.

The invention has been described in detail with particular reference to certain embodiments thereof, but it will be understood that variations and modifications can be affected within the spirit and scope of the invention.

What is claimed is:

1. A process for preparing a monoalkyl tris(dialkylamido) tin compound of Formula (I):

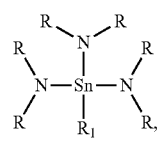

wherein each R is the same or different and is a $C_1$-$C_4$ alkyl group and $R_1$ is a substituted or unsubstituted saturated or unsaturated linear, branched, or cyclic $C_1$-$C_5$ group; wherein the process comprises:

contacting a compound of Formula (A)

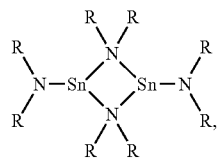

with a compound of Formula $R_1$—X, wherein X is bromo, iodo, or chloro.

2. The process of claim 1, wherein each R is independently a methyl, ethyl, propyl, isopropyl, n-butyl, isobutyl, t-butyl, or sec-butyl group.

3. The process of claim 1, wherein each R is a methyl group.

4. The process of claim 1, wherein $R_1$ is a methyl, ethyl, propyl, isopropyl, n-butyl, isobutyl, t-butyl, sec-butyl, n-pentyl, iso-pentyl, or neopentyl group.

5. The process of claim 1, wherein $R_1$ is a cyclic $C_1$-$C_5$ group.

6. The process of claim 1, wherein $R_1$ is a vinyl group or an acetylenyl group.

7. The process of claim 1, wherein $R_1$ is substituted with one or more halogen groups.

8. The process of claim 1, wherein $R_1$ is an alkylether group.

9. The process of claim 1, wherein each R is a methyl group and $R_1$ is an isopropyl group.

10. The process of claim 1, wherein X is iodo.

11. The process of claim 1, wherein the process is conducted in a non-polar aprotic solvent.

12. The process of claim 1, wherein the process further comprises preparing the compound of Formula (A) by reacting tin(II) chloride with a compound of Formula M-N($R)_2$, wherein M is sodium, lithium, and potassium.

13. The process of claim 12, wherein the compound of Formula M-N($R)_2$ is Li—N($CH_3)_2$.

14. The process of claim 12, wherein the process is conducted in one reaction vessel.

15. A compound of the Formula (II):

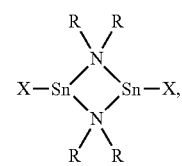

wherein each R is the same or different and is a $C_1$-$C_4$ alkyl group and X is iodo, bromo, and chloro, provided that wherein X is chloro, R is other than a methyl group.

16. The compound of claim 15, wherein each R is the same or different and is a $C_1$-$C_4$ alkyl and X is iodo and bromo.

17. The compound of claim 15, wherein each R is a methyl group and X is iodo.

18. The compound of claim 17 in crystalline form and having the structure as set forth in FIG. 1.

* * * * *